United States Patent [19]
Okauchi

[11] Patent Number: 5,229,890
[45] Date of Patent: Jul. 20, 1993

[54] DATA RECORDING SYSTEM FOR USE IN VIDEO TAPE RECORDER

[75] Inventor: Takeshi Okauchi, Chigasaki, Japan

[73] Assignee: Victor Company of Japan, Ltd., Japan

[21] Appl. No.: 548,336

[22] Filed: Jul. 5, 1990

[30] Foreign Application Priority Data

Jul. 7, 1989 [JP] Japan ................... 1-176493
Jul. 7, 1989 [JP] Japan ................... 1-176494

[51] Int. Cl.⁵ ........................................... G11B 27/02
[52] U.S. Cl. ................................. 360/14.2; 360/14.3
[58] Field of Search ................ 360/14.1, 14.2, 14.3, 360/33.1

[56] References Cited

U.S. PATENT DOCUMENTS

3,681,524  8/1972  Nicholls ................. 360/14.3 X
5,018,027  5/1991  Roggendorf ............... 360/14.2

FOREIGN PATENT DOCUMENTS

57-34633  7/1982  Japan .

OTHER PUBLICATIONS

Nishimoto, Naomichi; Okauchi, Takeshi; Kitazawa, Hiroaki: VHS VCR With Index and Address Search System; In: IEEE Transactions on Consumer Electronics, vol. CE-33, No. 3, Aug. 1987, pp. 220 to 224.

Primary Examiner—Andrew L. Sniezek
Attorney, Agent, or Firm—Lowe, Price, LeBlanc & Becker

[57] ABSTRACT

A data recording system for use in video tape recorders selects one of a plurality of data including position information of a magnetic tape on and from which a video signal is recorded and reproduced by the video tape recorder, and controls the duty cycle of control pulses in accordance with the selected data when recording the control pulses in a control track of the magnetic tape. The data recording system is arranged to add dummy bits to a data block including the control pulses and to change the number of the dummy bits at a predetermined period. The dummy bits are added at the tailing end of the data block following the time code, and the first bit of the dummy bits represents the number of the dummy bits and is disposed in a predetermined position related to the leading bit of the data block. This arrangement corrects the time deviation of the time codes without skipping the contents of the time code data.

9 Claims, 5 Drawing Sheets

DATA RECORDING SYSTEM FOR USE IN VIDEO TAPE RECORDER

BACKGROUND OF THE INVENTION

The present invention relates generally to a data recording system for recording data relating to position information and specific functions in a control track of a magnetic tape, and is applicable particularly, but not exclusively, to video tape recorders (which will hereinafter be referred to as VTRs).

In conventional VTRs, a data recording/reproducing system based upon the so-called CTL coding system, in which data relating to tape-position information and comment information are recorded in a control track with the duty cycle modulation (e.g., PWM) of control pulses (CTL pulses), is employed for enabling users to access a desired position randomly. Since various types of data are selectively recorded on a control track and reproduced therefrom, such a data recording system can be lower-priced in construction as compared with the SMPTE time code recording/reproducing system which records the absolute position of a magnetic tape with respect to the recording start position with the absolute position being expressed in a pulse form and, in addition, allows freely recording various information with an extremely simple operation.

Since it is general that the period of the control pulses is one frame period (1/30 sec. period in NTSC systems), in the method of recording data with the duty cycle of the control pulses being arranged to be variable, the data transmission bit rate is extremely small to be 30 bits per second and, in the case of recording a code such as a time code which is constructed as a data block with a great number of bits, the recording/reproduction of one data block consumes several seconds. When recording the time code by means of the CTL coding system, since the CTL cording system is records only one bit per frame, it is impossible to directly record the code format in the same manner as the SMPTE time code which is constructed with 80 bits per frame. Thus, the address code is treated as the time data and recorded on a tape at a predetermined time interval (for example, every minute) so that the frame counter is reset at the address code and counts the CTL pulses for indicating a playing time. There is a problem which arises with such a CTL coding system, however, in that the timing of resetting is shifted if even one of the data in the address code is lost. In addition, in the case of an NTSC color signal, because a nominal frame number is 29.97 frames per second, the time code substantially becomes difficult to be coincident with the real time.

SUMMARY OF THE INVENTION

It is therefore an object of the present invention to provide a data recording system for use in VTRs which is capable of coincidence with the real time in recording the time code according to the CTL coding system.

One feature of a VTR data recording system according to the present invention is that, for recording a time code in accordance with the CTL coding system, dummy bits are added to a data block and the number of the dummy bits is changed at a predetermined period. That is, according to the present invention, a VTR data recording system is provided which selects one of a plurality of data including position information of a magnetic tape on and from which a video signal is recorded and reproduced by means of a VTR and, in accordance with the selected data controls the duty cycle of control pulses produced with a predetermined-period when recording the control pulses in a control track of the magnetic tape. The data recording system comprises means for adding dummy bits to a data block comprising the control pulses representing the time code data and further means for periodically changing the number of the dummy bits.

Another feature of the VTR data recording system according to this invention is that, for recording a time code in accordance with the CTL coding system, dummy bits are added to a rear portion of a data block and the number of the dummy bits is changed at a predetermined period when recording the data block in a control track of a magnetic tape, and further a bit which is in a predetermined position relation to the head bit of the data block is used as a decision bit representing the number of the dummy bits. That is, according to the present invention, a VTR data recording system is provided which selects one of a plurality of data, including position information of a magnetic tape on and from which a video signal is recorded and reproduced by means of a VTR, and which controls the duty cycle of predetermined-period-produced control pulses in accordance with the selected data when recording the control pulses in a control track of the magnetic tape. The data recording system comprises means for adding dummy bits to a rear portion of a data block including the control pulses representing the time code data, means for changing the number of the dummy bits at a predetermined period, and means for setting as a decision bit representing the number of the dummy bits a bit which is in a predetermined position relation to the head bit of the data block.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
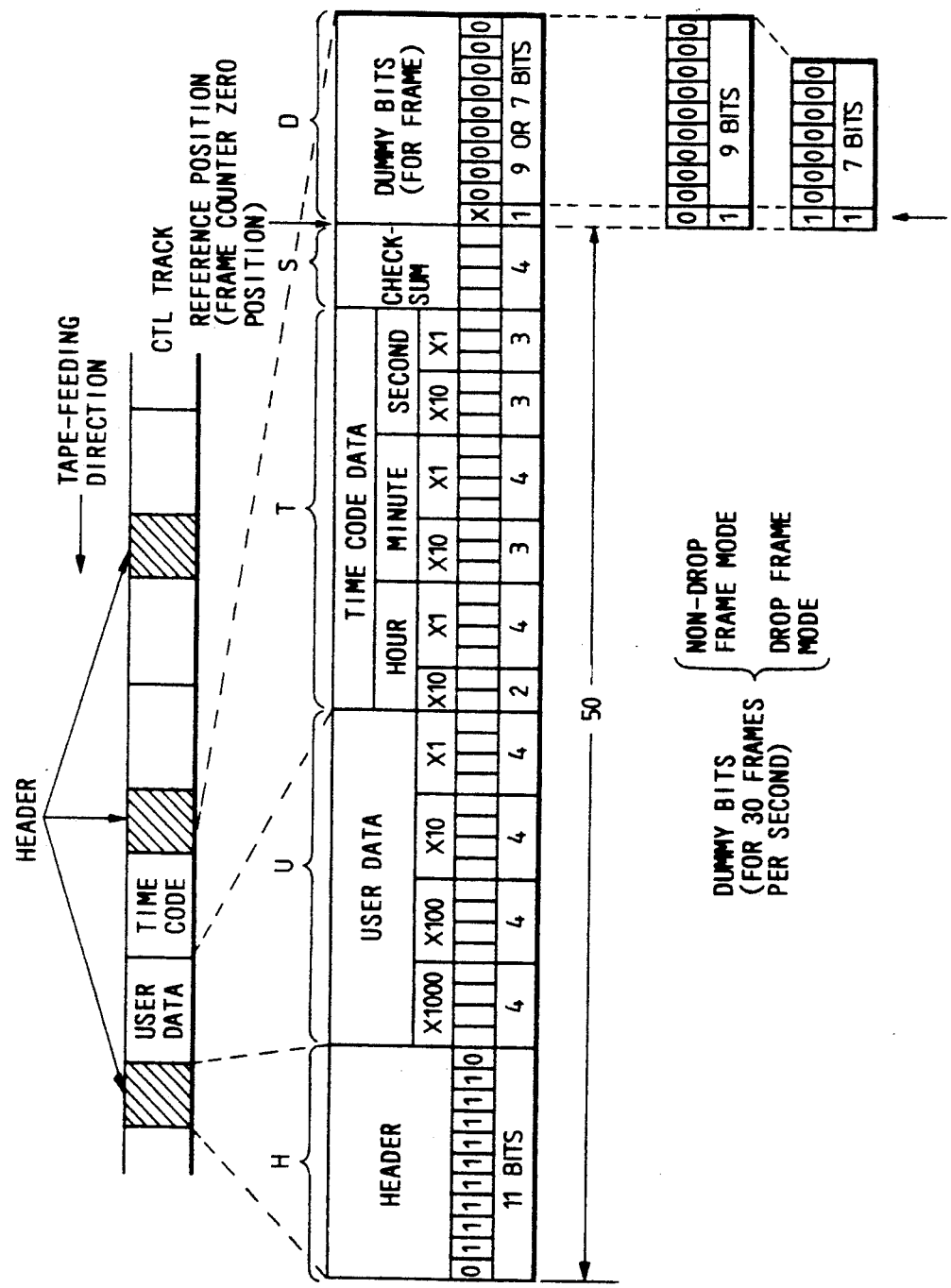
FIG. 1 is an illustration of a signal format of data to be recorded by a data recording system of this invention.

A data recording system for use in VTRs according to a first embodiment of the present invention will be described hereinbelow. The data recording system is arranged such that, in order to correct the time deviation of the time code in the CTL coding system, dummy bits are provided in a code frame so that the number of the dummy bits is changed at a predetermined period. That is, in recording the time code in accordance with the CTL coding system, in the case of NTSC, dummy bits (10 bits) are added to a 50-bit code block in order to achieve the time coincidence with the real time. In the case of NTSC, since the accurate frame number is 29.97 frame per second, the frame number due to counting the CTL pulses deviates with respect to the real time. This deviation results in 108 frames (3.6 seconds) per hour and hence provides an important problem if working for a long time. The correction of this deviation can be effected with 108 bits being reduced from the number of the dummy bits per hour (10 bits×60×60/2=18000). More specifically, the number of the dummy bits in the time code having the data representing every minute on the minute (00 second) except for every 10 minutes (i.e., 0, 10, 20, 30, 40 and 50 minutes) is reduced by 2 bits so as to become 8 bits, that is, (60−6)×2 bits=108 bits.

FIG. 1 shows a format of data to be recorded by the data recording system according to this emboidment. In FIG. 1, character H represents a header comprising 11 fixed bits and character U designates 16 user bits (4 bit BCD 4 figures) for recording the program numbers or others through an input device such as keyboard by the users. Further, character T denotes 19-bit (BCD 6 figures) time information data for expressing the present time in units of hour, minute and second. The initial 2 bits are for showing the 10-place of "hour", the next 4 bits are for showing the 1-place of "hour", the following 3 bits are for showing the 10-place of "minute", the next 4 bits are for showing the 1-place of "minute", the next 3 bits show the 10-place of "second" and the following 3 bits show the 1-place of "second". Further, character S depicts a 4-bit checksum. Still further, character D represents 8 or 10 dummy bits. Of these 8 or 10 dummy bits, the initial bit is for distinguishing between a correction mode and a non-correction mode. When the initial bit is "0", the non-correction mode (non-drop frame mode) is taken so as not to perform the time-deviation correction. When the initial bit is "1", the correction mode (drop frame mode) is performed so that the number of the dummy bits is determined to be 8 (including the initial bit) at every minute on the 20 minute (00 second) except for every 10 minutes (0, 10, 20, 30, 40 and 50 minutes). Here, since one data frame comprising 60 bits corresponds to about 2 seconds in the case of the NTSC 29.97-frame-per-second video signal (for example), the 1-place of "second" in the time information data T may show only 5 values, i.e., 0, 2, 4, 6, and 8 seconds, and hence only 3 bits can be used therefor.

According to the above-mentioned signal format to be recorded by the data recording system of this embodiment, without skipping the time code data, the time deviation correction can be performed with change of the data length in the data block. In addition, the data in the time code data can directly be used for the 25-frame-per-second video signal in the PAL, SECAM or the like without generation of the time deviation.

As described above, the dummy bits are added to a data block for the purposes of controlling the real time in recording the time code in accordance with the CTL coding system, and the number of the dummy bits is reduced to be 8 in the drop frame mode and the number of the dummy bits is maintained to be 10 in the non-drop frame mode. Here, the drop frame mode is required if operation such as an edit is performed in correspondence with the real time, while the non-drop frame mode is advantageously taken in home-use VTRs in which the operation performed in correspondence with the real time is not required, because the process for the non-drop frame is simple. Accordingly, it is better to properly use both the modes. However, it is impossible to discriminate between both the modes by the code itself. Thus, the first bit of the dummy bits is used as a decision bit for distinguishing between the drop frame mode and the non-drop frame mode. That is, as illustrated in FIG. 1, in recording the code, the decision bit is arranged to assume "1" in the case of the drop frame mode and take "0" in the case of the non-drop frame mode.

Moreover, the dummy bits are recorded at the rear side of the time data block as illustrated in FIG. 1. This is for always fixing the decision bit to the 51st bit from the leading bit of the time code, thereby immediately distinguishing between the drop frame mode and the non-drop frame mode in reading out the code. If the dummy bits are placed at the front side of the data block, the position of the decision bit varies in accordance with the number of the dummy bits so that difficulty is encountered to immediately performing the mode decision. More specifically, when decoding the time code in reproduction, the decision between the drop frame mode and the non-drop frame mode is made in accordance with the first bit of the dummy bits. Since the dummy bits are placed at the rear side of the data block, the decision of the mode for the time code data in the data block can immediately be made by checking the contents of the 51th bit from the leading bit of the header, and since the dummy bits whose bit length varies at a predetermined period are placed at the last portion of the data block, the decision can be made even if reading the user data and the time code data.

If the dummy bits are provided between the header and the user bits, the positions of the respective data are shifted by 2 bits with respect to the header in accordance with the number (8 or 10) of the dummy bits. Further, if the dummy bits are provided at the front side of the header, the decision bit which is the 51st bit from the leading bit of the header becomes difficult to be used for the next data block. Still further, in the case of checking the decision bit of the dummy bit before the header detection by using an appropriate memory, the position of the decision bit varies in accordance with the number of the dummy bits, and therefore it becomes impossible to immediately perform the mode decision.

Figure 2:
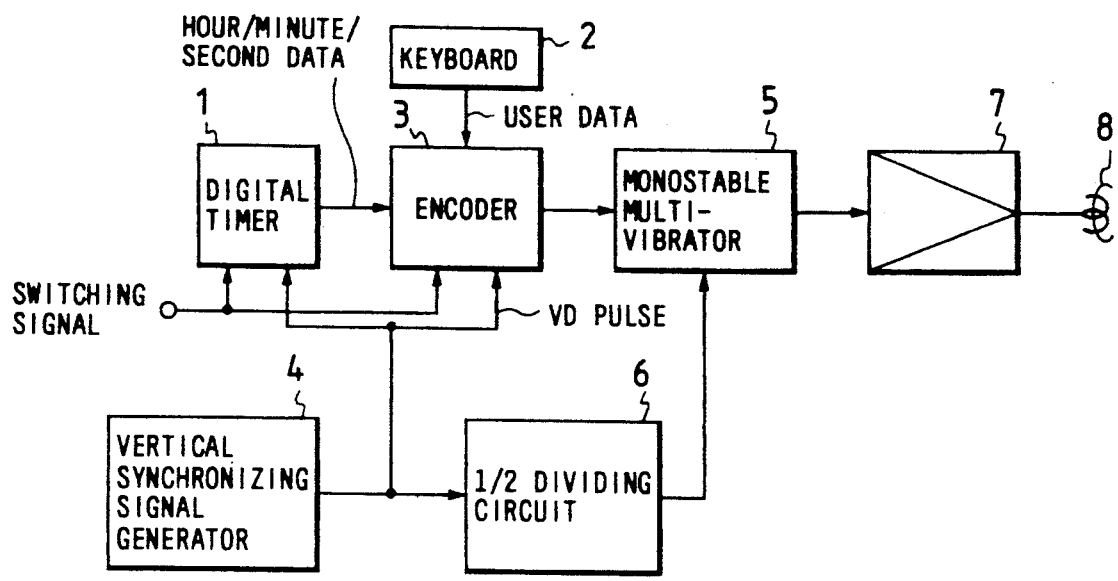
FIG. 2 is a block diagram showing an arrangement of a data recording system according to a first embodiment of this invention.

FIG. 2 is a block diagram showing the data recording system of this embodiment which records the FIG. 1 code format in a CTL track of a magnetic tape. In FIG. 2, illustrated at numeral 1 is a known digital timer which outputs hour/minute/second data. The digital output of the digital timer 1 is supplied to an encoder 3 which is also responsive to a signal (user data) from a keyboard 2 so as to output coded pulses. The coded pulses are arranged to be synchronous with clocks (VD pulses) from a vertical synchronizing signal generating circuit 4 so as to prevent variation of the time-axis. The output signal of the encoder 3 is applied to a monostable multivibrator 5 so as to modulate a period obtained by dividing the clock frequency into ½ in a frequency divider 6, thereby obtaining time-coded pulses. Thereafter, the time-coded pulses are supplied to a recording amplifier 7 and then fed to a well known CTL head 8 to be recorded as the control track of the magnetic tape.

Figure 3:
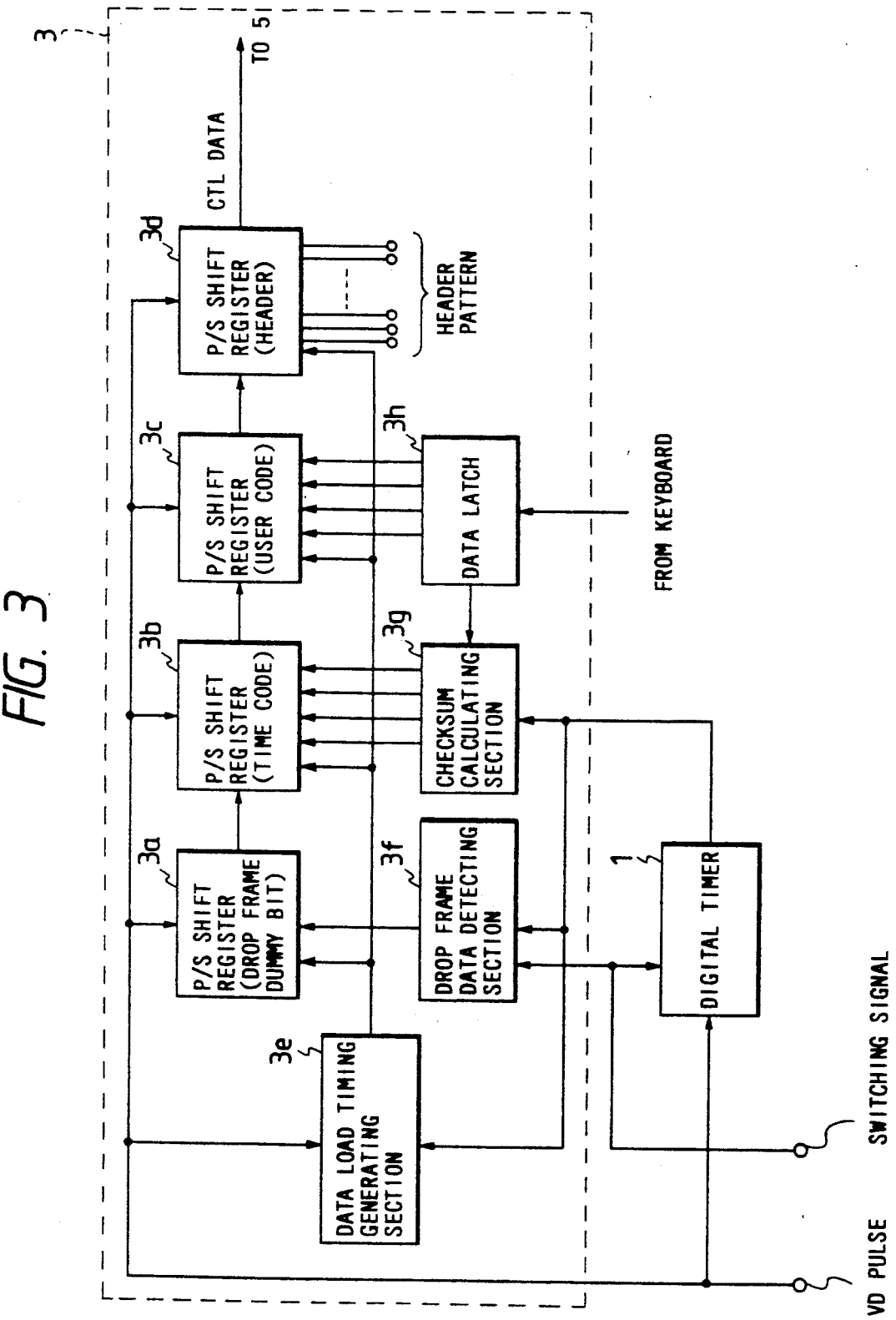
FIG. 3 is block diagram showing an arrangement of a an encoder of the FIG. 2 data recording system.

FIG. 3 is a block diagram showing an arrangement of the encoder 3 illustrated in FIG. 2. In FIG. 3, a drop-frame/non-drop frame switching signal supplied to both the digital timer 1 and encoder 3 is a signal which assumes one of H (high level) and L (low level) by selection through a manual switch, not shown, and is similar to the signal used for the SMPTE. The digital timer 1 is a hour/minute/second frame counter and receives a VD pulse as a clock. The count value thereof is controlled as time data (hour/minute/second frame) and supplied as parallel data to the encoder 3. In the case that the drop frame mode is selected in accordance with the drop frame/non-drop frame switching signal, it is in advance reset so as to skip the count value. The skipping is made for 2 frames, i.e., 0 and 1, at every minute on the minute (00 second) other than every 10 minutes (0, 10, 20, 30, 40 and 50 minutes). For this digital timer 1, it is possible to use a time code generator IC (for example, EECo-5200 manufactured by Sony Co., Ltd). The encoder 3 is equipped with parallel-serial (P/S) shift registers 3a to 3d, a data load timing generating section 3e, a drop frame data detecting section 3f, a checksum calculating section 3g and a data latch 3h. The respective P/S shift registers 3a to 3d are for the drop frame and dummy bits, the time code, the user code, and the header. The data load timing generating section 3e controls the writing timing of data into the respective P/S shift registers 3a to 3d and is responsive to the output signal of the digital timer 1 and the VD pulse. The output of the digital timer 1 is supplied to the drop frame data detecting section 3f and further to the checksum calculating section 3g. The data latch 3h inputs the user data from the keyboard 2 illustrated in FIG. 2. That is, the user data inputted from the keyboard 2 are latched by the data latch 3h and outputted to the P/S shift register 3d and the checksum calculating section 3g.

The hour/minute/second data inputted from the digital timer 1 are supplied to the checksum calculating section 3g which in turn perform the checksum calculation on the basis of the hour/minute/second data and the user data so as to output the calculation result together with data. Further, the drop frame data detecting section 3f detects the time data (except 0, 10, 20, 30, 40 and 50 minutes) corresponding to the drop frame on the basis of the hour/minute/second data and outputs the detection status to the P/S shift register 3a only in the case that the status of the drop frame mode is selected. The data load timing generating section 3e receives the VD pulse as a clock and generates a load pulse after decision of the second data so as to load value to the respective P/S shift registers 3a to 3d. The data which have been loaded are outputted as the CTL data by one bit from the header 3d to the monostable multivibrator 5 illustrated in FIG. 2.

Figure 4:
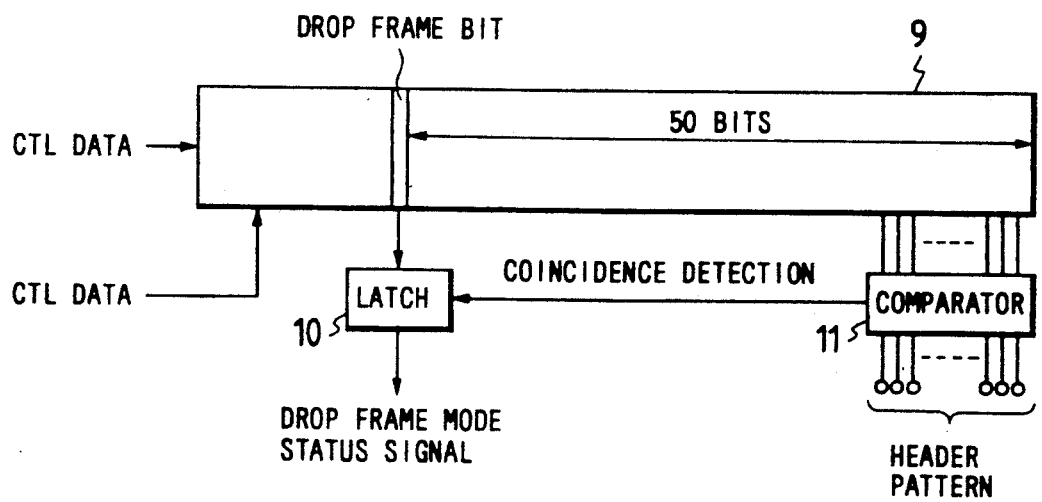
FIG. 4 is an illustration of a decoder employed for the data recorded by the FIG. 2 data recording system.

The CTL data recorded on a magnetic tape through the magnetic head 8 illustrated in FIG. 2 is reproduced in accordance with the system disclosed in the Japanses Utility Model Publication No. 57-34633. In the reproducing circuit, an arrangement of the decoder which is responsive to the duty detecting section is illustrated in FIG. 4. In FIG. 4, the CTL data (duty decision value) and CTL pulse inputted from the duty detecting section are inputted into a shift register 9 having a length above 51 bits and the data are latched in accordance with the CTL pulse which is used as a clock. A comparator 11, being coupled to the output side of the shift register 9, successively compares the 11 bits with a header pattern. If agreeing therewith, a latch 10 latches 51st bit data (corresponding to the drop frame bit) at the output side thereof in the coincidence detecting status so as to output it as the drop frame mode status.

Further embodiments of this invention will be described hereinbelow. These embodiments are arranged so as to set a time code (CTLTC) as means for newly recording time data in the CTL coding system. This time code is constructed with 50-bit data, i.e., a header (11 bits), user data (4-bit BCD 4 figures), time code data (BCD 6 figures) and a checksum (4 bits). In the case of a 30-frame-period video signal in the NTSC, dummy bits (10 or 8 bits) are further added to the rear side of the checksum so that the total bit number becomes 60 or 58.

Figure 5:
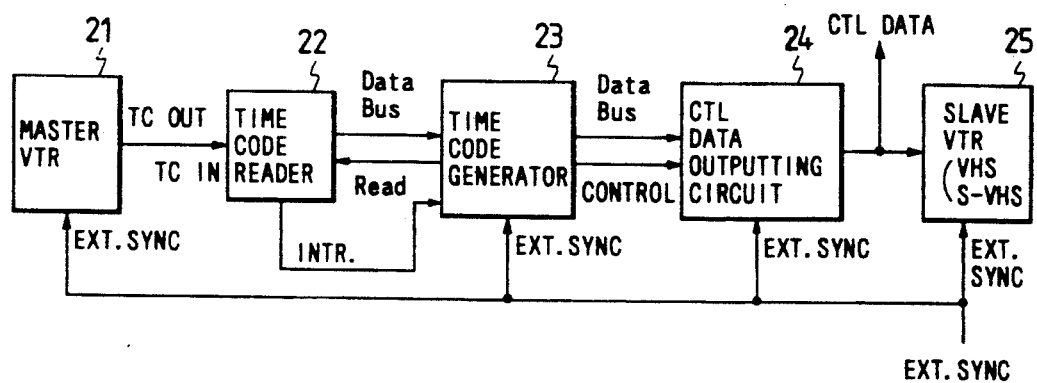
FIG. 5 is a block diagram showing an arrangement of a data recording system according to a second embodiment of the present invention.
Figure 6:
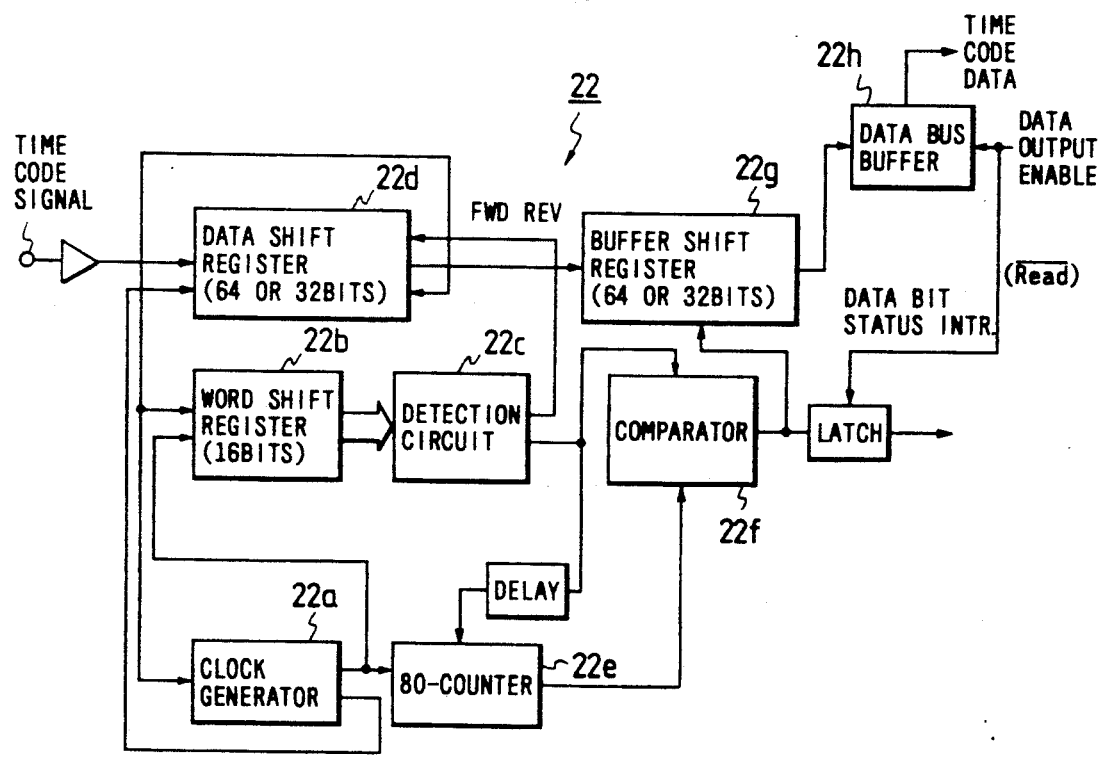
FIG. 6 is a block diagram showing an arrangement of a SMPTE time code reader of the FIG. 5 data recording system.

FIG. 5 is a block diagram showing a data recording system according to a second embodiment of this invention. In FIG. 5, illustrated at numeral 21 is a master VTR which records a SMPTE time code and outputs a SMPTE time code signal through a time-code output terminal TCOUT when being in the reproducing mode, the SMPTE time code signal from master VTR 21 being fed to an input terminal TCIN of a SMPTE time code reader 22. The time code reader 22 has an arrangement as illustrated in FIG. 6. In FIG. 6, the inputted time code signal is supplied to a clock generator 22a so as to derive a clock signal (generate clocks) from the inputted time code signal and then supply the clock signal to a synchronous word shift register 22b which in turn inputs the time code signal in response to the clock signal therefrom. The synchronous word shift register 22b is coupled to a synchronous detection circuit 22c to detect the synchronizing portion to distinguish between the reading directions of FWD/REV in accordance with the bit information after the synchronous detection to generate a reading direction signal. The reading direction signal generated by the synchronous detection circuit 22c is fed to a data shift register 22d which in turn inputs the time code signal in response to the reading direction signal therefrom.

The clock generator 22a is also coupled through an 80-counter 22e, which counts the clocks up to 80 and then generates a count signal which is in turn supplied to a comparator 22f to compare the count signal in timing with the detection signal from the synchronous detection circuit 22c check whether the data are correct. The comparator 22f outputs a data-reading timing pulse to a buffer shift register 22g which in turn outputs a 64- or 32-bit time code to a data bus buffer 22h for keeping the contents (hour, minute, second, frame) of the time code. The contents of the time code can be read from an external through a data bus by setting a read status Read to low. Further, the data may be arranged to be read out when a data set status INTR which shows that a new time code is read becomes high. This is for preventing the same data from being repeatedly read out. The data set status INTR is set to be low in response to the read status Read being set to be low.

Returning again to FIG. 5, the contents of the time code kept in the data bus buffer 22h of the time code reader 22 are read out by means of a time-code generator 23. The time-code generator 23 has a time-code counter (hour, minute, second) which is arranged such that the count value becomes equal to the value read by the time-code reader 22. Thus, the time code value read out from the master VTR 21 is synchronously generated by the time-code generator 23. When the frame data and "second" of the generated time code value are 0 second and 10 frames, 2 seconds and 10 frames, 4 seconds and 10 frames, 6 seconds and 10 frames, and 8 seconds and 10 frames, the time code generator 23 supplies a writing start signal and a writing time code value to a CTL data output circuit 4. Here, only the hour/minute/second data obtained by adding 2 seconds to the time code value at that time are recorded, and the address of the frame data are not recorded. The 10 frames correspond to 10 dummy bits, and in the case of PAL whose frame frequency is 25 Hz, the supply is not required, and in response to 0 second (0 frame), 2 seconds and 4 seconds, the writing time code is supplied.

The CTL data output circuit 24 starts to output the data in order from the leading bit of the header in the next frame in response to the writing start signal. Here, the time code value to be outputted is the data just supplied from the time-code generator 23. The outputted CTL data are led to a slave VTR 25 so as to be used as a duty-variable signal comprising recording control pulses.

More specifically, in the data recording system illustrated in FIG. 5, the SMPTE time code reader 22 detects a first time code (i.e., the CTL time code) assigned to the respective television frame, and the time code generator 23 generates on the basis of this detection result, a second time code (e.g. the CTL time code), so that the first time code for each of the frames of the television signal is converted into the second time code for a plurality of frames and is recorded as variation of the duty ratio of the control signal on a control track through the CTL data output circuit 24. Thus, the SMPTE time code recorded on a master tape becomes coincident in units of frame with the time code recorded on a tape of the slave VTR 25 in accordance with the CTL coding system, and operation under the time code is also allowed at the slave VTR 25 side, and further the data can be used at the master side.

Here, in the above-mentioned conversion dubbing system from the SMPTE time code to the CTL time code, if the VITC (Vertical Interval Time Code) is used instead of the SMPTE time code, the SMPTE time code reader 22 is changed to a VITC reader and the TC terminal connection is changed to a VIDEO connection.

Figure 7:
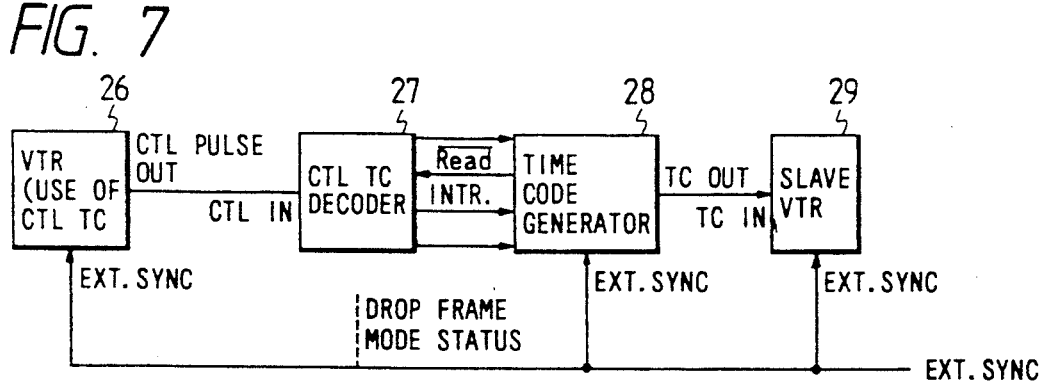
FIG. 7 is a block diagram showing an arrangement of a data recording system according to a third embodiment of this invention.
Figure 8:
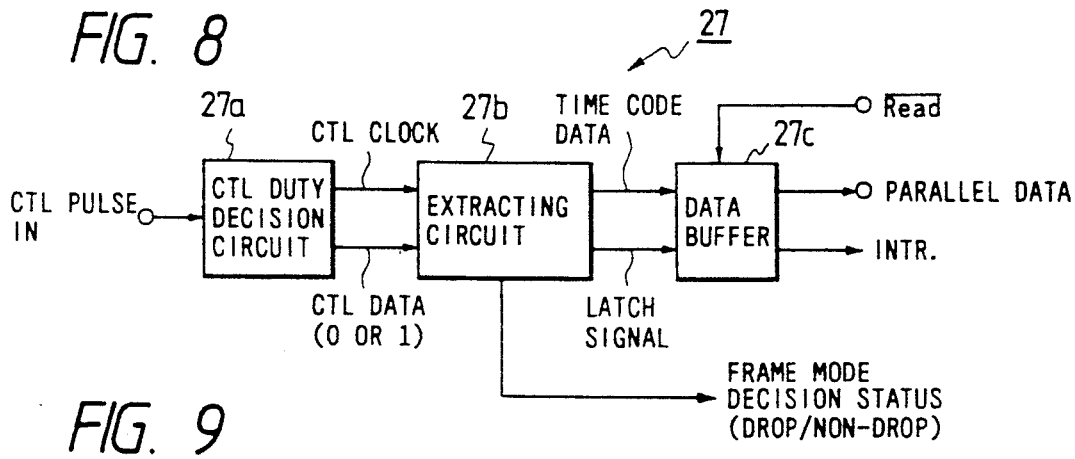
FIG. 8 is a block diagram showing an arrangement of a CTL time code decoder of the FIG. 7 data recording system.

FIG. 7 is a block diagram showing a data recording system according to a third embodiment of this invention, where a CTL time code recorded in a master VTR is read out in reproduction and a SMPTE time code synchronously generated is recorded in a slave VTR. In FIG. 7, when a master VTR 26 is in the reproducing mode, a CTL pulse outputted from a CTL pulse output terminal is supplied to a CTL pulse input terminal of a CTLTC decoder 27. The CTLTC decoder 27 has an arrangement as illustrated in FIG. 8. The decision of the duty ratio of the inputted CTL pulse is made by means of a CTL duty decision circuit 27a. The CTL data comprising "0" and "1" are extracted and, together with CTL clock, supplied to a time code data extracting circuit 27b. The time code extracting circuit 27b latches the CTL data and detects the header to extract the time code data and further checks the drop frame bit in the latched data to output the decision status of the drop frame bit and still further supplies the latched data to a data buffer 27c. In response to the data being set, the data buffer 27C sets the data set status INTR to the high level, and in response to the low level being applied to the data output enabling input (Read), outputs the time code data to the parallel data output and then resets the data set status INTR to low.

Figure 9:
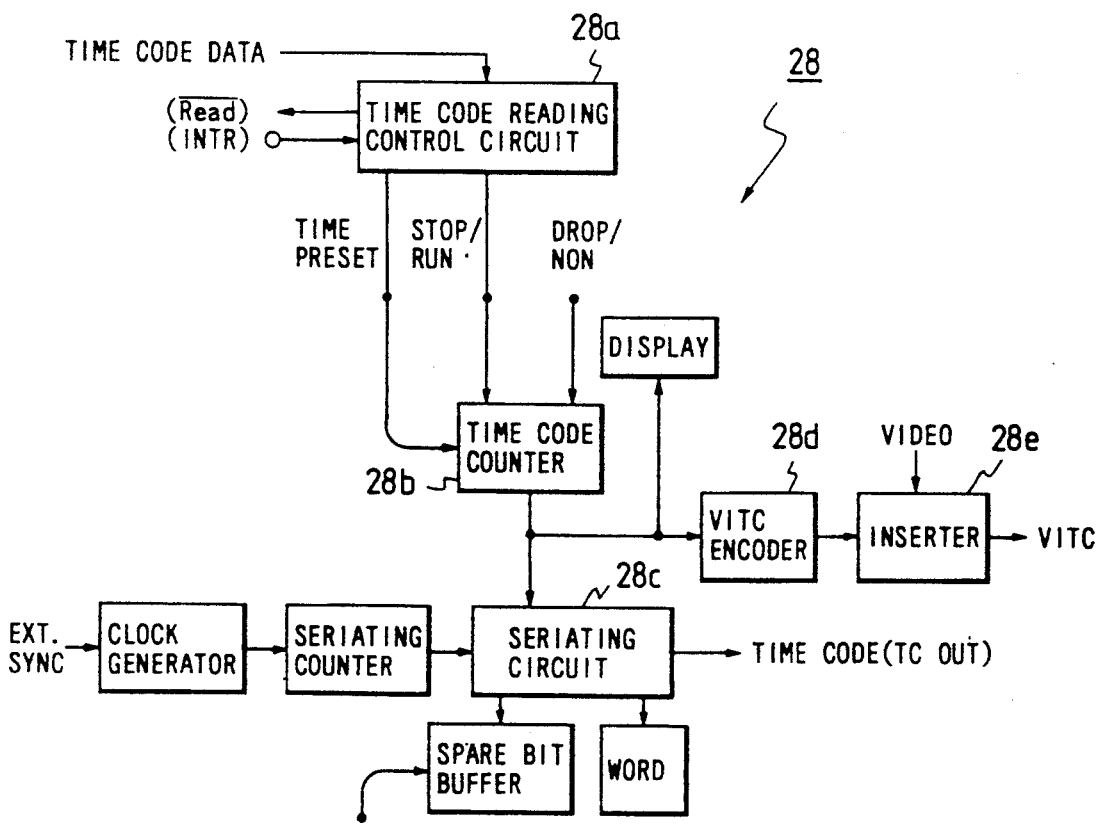
FIG. 9 is a block diagram showing a time code generator of the FIG. 7 data recording system.

Returning again to FIG. 7, a time code generator 28 which receives the output of the CTLTC decoder 27 has an arrangement as illustrated in FIG. 9. A time-code reading control circuit receives the output of the CTLTC decoder 27 so as to supply it as a preset value to a time code counter 28b which in turn starts the counting operation in response thereto. The counter 28b counts up every frame. Here, one time code is assigned for one frame. The count value (time code data) is converted into a serial data by means of a seriating circuit 28c and then outputted to a time-code output terminal TCOUT in synchronism with an external synchronizing signal EXTSYNC. This output is supplied to a time-code input terminal TCIN of a slave VTR 29 illustrated in FIG. 7 so as to be recorded in a time code track of a slave tape when being in the recording mode.

Accordingly, in the third embodiment described with reference to FIGS. 7 to 9, the CTL time code recorded in the control track for a period of a plurality of TV frames is detected by means of the CTLTC decoder 27, and a new time code relative to each TV frame (for example, the SMPTE time code) is generated on the basis of this detection result by means of the time-code generator 28 and then recorded in the cue track or video track so as to be positioned in the vertical blanking of the television signal. Here, in the case that the above-mentioned conversion dubbing system from the CTL time code to the SMPTE time code is used for the VITC, the time-code generator 28 is required to further have an encoder 28d and an inserter 28e for inserting the code signal into the video signal, as illustrated in FIG. 9.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. In a data recording system for a video tape recorder which records control pulses in a control track of a magnetic tape of said video tape recorder with the duty cycle of said control pulses being changed in accordance with data relating to said magnetic tape, the improvement comprising:

means for adding dummy bits to a data block including said control pulses, said adding means adds said dummy bits at an end position of said data block, the leading bit of said dummy bits represents the number of said dummy bits and is in a predetermined position relation to the first bit of said data block; and means for changing the number of said dummy bits at a predetermined period.

2. A data recording system as claimed in claim 1, wherein said adding means adds a predetermined number of said dummy bits to said data block and said changing means changes the predetermined number of said dummy bits to be reduced by a predetermined number at said predetermined period thereby to match a time code represented by said data block with real time.

3. A data recording system as claimed in claim 1, wherein said adding means adds said dummy bits at a position following a time code contained in said data block.

4. In a data recording system for a video tape recorder including means for recording control pulses in a control track of a magnetic tape and modulating means for pulse width modulating said control pulses in accordance with data relating to said magnetic tape, the improvement comprising:
   means for adding dummy bits to a data block including said control pulses;
   means for periodically changing the number of said dummy bits at a predetermined period thereby to synchronize a time code included in said data block with real time; and
   means for controlling said modulating means to modulate a first bit of said dummy bits to identify the number of said dummy bits added to said data block.

5. An improved data recording system in accordance with claim 4, wherein said adding means adds said dummy bits at a position in said data block following bits representing a checksum in said data block.

6. An improved data recording system in accordance with claim 4, wherein said changing means controls said adding means for periodically reducing a number of said added dummy bits.

7. In a data recording system for a video tape recorder including means for recording control pulses in a control track of a magnetic tape and modulating means for pulse width modulating said control pulses in accordance with data relating to said magnetic tape, the improvement comprising:
   first means for adding dummy bits to a data block including said control pulses;
   second means for periodically controlling said first means to periodically change the number of said added dummy bits at a predetermined period; and
   third means for controlling said modulating means to modulate a predetermined bit of said data block to represent the number of said added dummy bits, said predetermined bit having a predetermined position relative to a first bit of said data block, said third means controls said modulating means to modulate the first bit of said dummy bits to identify the number of said added dummy bits.

8. An improved data recording system in accordance with claim 7, wherein said first means adds said dummy bits at a position in said data block following bits representing a time code in said data block.

9. An improved data recording system in accordance with claim 7, wherein said second means controls said first means for periodically reducing the number of said added dummy bits thereby to synchronize a time code included in said data block with real time.

* * * * *